United States Patent
Bhat et al.

(10) Patent No.: US 10,964,083 B1
(45) Date of Patent: Mar. 30, 2021

(54) FACIAL ANIMATION MODELS

(71) Applicant: Lucasfilm Entertainment Company Ltd., San Francisco, CA (US)

(72) Inventors: Kiran S. Bhat, San Francisco, CA (US); Michael Koperwas, San Francisco, CA (US); Rachel M. Rose, San Francisco, CA (US); Jung-Seung Hong, San Francisco, CA (US); Frederic P. Pighin, Sausalito, CA (US); Christopher David Twigg, San Francisco, CA (US); Cary Phillips, Moss Beach, CA (US); Steve Sullivan, Mill Valley, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 13 days.

(21) Appl. No.: 16/380,653

(22) Filed: Apr. 10, 2019

Related U.S. Application Data (63) Continuation of application No. 13/361,350, filed on Jan. 30, 2012, now Pat. No. 10,269,165.

(51) Int. Cl.
  *G06T 13/40* (2011.01)
(52) U.S. Cl.
  CPC ................. *G06T 13/40* (2013.01)
(58) Field of Classification Search
  None
  See application file for complete search history.

(56) References Cited

U.S. PATENT DOCUMENTS

| | | | | |
|---|---|---|---|---|
| 5,649,086 | A | * 7/1997 | Belfer | G06T 13/40 345/441 |
| 6,061,072 | A | 5/2000 | Rouet et al. | |
| 7,391,420 | B1 | * 6/2008 | Coyne | G06T 13/00 345/473 |
| 8,330,823 | B2 | 12/2012 | Gordon | |
| 2002/0012454 | A1 | * 1/2002 | Liu | G06K 9/00281 382/118 |
| 2005/0057569 | A1 | * 3/2005 | Berger | G06K 9/00315 345/473 |

(Continued)

*Primary Examiner* — Andrew G Yang
(74) *Attorney, Agent, or Firm* — Kilpatrick Townsend & Stockton LLP (57) ABSTRACT

A system includes a computing device that includes a memory configured to store instructions. The system also includes a processor configured to execute the instructions to perform a method that includes receiving multiple representations of one or more expressions of an object. Each of the representations includes position information attained from one or more images of the object. The method also includes producing an animation model from one or more groups of controls that respectively define each of the one or more expressions of the object as provided by the multiple representations. Each control of each group of controls has an adjustable value that defines the geometry of at least one shape of a portion of the respective expression of the object. Producing the animation model includes producing one or more corrective shapes if the animation model is incapable of accurately presenting the one or more expressions of the object as provided by the multiple representations.

20 Claims, 7 Drawing Sheets

(56) References Cited

U.S. PATENT DOCUMENTS

| | | | |
|---|---|---|---|
| 2005/0083332 A1* | 4/2005 | Hung | G06T 13/40 |
| | | | 345/473 |
| 2008/0170777 A1 | 7/2008 | Sullivan et al. | |
| 2008/0187174 A1 | 8/2008 | Metaxas et al. | |
| 2009/0066700 A1 | 3/2009 | Harding et al. | |
| 2009/0195545 A1* | 8/2009 | Debevec | G06T 13/40 |
| | | | 345/473 |
| 2010/0164862 A1 | 7/2010 | Sullivan et al. | |
| 2011/0069879 A1* | 3/2011 | Hwang | G06K 9/00315 |
| | | | 382/154 |

* cited by examiner

FACIAL ANIMATION MODELS

CROSS-REFERENCES TO RELATED APPLICATIONS

This application is a continuation of Ser. No. 13/361,350, filed Jan. 30, 2012. The disclosure of which is hereby incorporated by reference in its entirety for all purposes.

TECHNICAL FIELD

This document relates to a system for producing animation models such as facial animation models.

BACKGROUND OF THE INVENTION

Ever increasing computational power allows complex calculations to be tackled with increased efficiency in less time. For example, robust computer systems can execute applications to simulate objects such as fictional characters and even realistic-looking human forms. To visually present such seemingly realistic characters, a significant amount of detail may be included in the simulated objects (e.g., fine wrinkles in the corner of a character's eye). However, even with increased computational power, a considerable amount of time may be needed to produce such levels of detail for simulating objects. Further, some projects may call for multiple characters (e.g., a motion picture that only includes animated characters) and possibly increase production time by multiple folds.

BRIEF SUMMARY OF THE INVENTION

The described systems and techniques are for efficiently producing an animation model in a "top-down" manner by using collected representations of an object (e.g., electronic scans of different facial expressions as presented by actor). Providing a construction base, the collected representations (e.g., scanned facial expressions) can be actually presented along with other representations (e.g., other facial expressions) by the produced model.

In one implementation, rather than painstakingly building a detailed model of a character's face in a serial manner to represent various expressions, a "top-down" approach is implemented to efficiently construct a model. Initiated by collecting facial expressions (e.g., scanned from the actor's face, individually sculpted, etc.), the collected expressions are processed together to construct a model that is capable of representing each of the collected expressions (along with other expressions).

In one aspect, a computer-implemented method includes receiving multiple representations of one or more expressions of an object. Each of the representations includes position information attained from one or more images of the object. The method also includes producing an animation model from one or more groups of controls that respectively define each of the one or more expressions of the object as provided by the multiple representations. Each control of each group of controls has an adjustable value that defines the geometry of at least one shape of a portion of the respective expression of the object. Producing the animation model includes producing one or more corrective shapes if the animation model is incapable of accurately presenting the one or more expressions of the object as provided by the multiple representations.

Implementations may include any or all of the following features. Producing the animation model may include using the position information of the one or more representations. Producing the animation model may include using a mesh of vertices that represents one of the one or more expressions of the object. The produced animation model may be an updated version of another animation model. Each control in the groups of controls may be selected from a standard set of controls. Each control in each group of controls may be selected based upon the corresponding expression of the object. Producing the animation model may include producing one or more shapes capable of presenting each of the one or more expressions of the object. Producing the animation model may include determining if the animation model is capable of accurately presenting the one or more expressions of the object. Producing the animation model may include determining if the animation model is capable of accurately presenting the one or more expressions of the object. Producing the animation model may include adding the one or more corrective shapes to the animation model, in which each corrective shape is associated with two or more controls included in one of the groups of controls. The collected images of the object may include visual scans of the object. The collected images of the object may include images of the object electronically created by an individual. The one or more expressions may include facial expressions. The object may be an actor's face, the face of a non-human creature, or other type of object.

In another aspect, a system includes a computing device that includes a memory configured to store instructions. The system also includes a processor configured to execute the instructions to perform a method that includes receiving multiple representations of one or more expressions of an object. Each of the representations includes position information attained from one or more images of the object. The method also includes producing an animation model from one or more groups of controls that respectively define each of the one or more expressions of the object as provided by the multiple representations. Each control of each group of controls has an adjustable value that defines the geometry of at least one shape of a portion of the respective expression of the object. Producing the animation model includes producing one or more corrective shapes if the animation model is incapable of accurately presenting the one or more expressions of the object as provided by the multiple representations.

Implementations may include any or all of the following features. Producing the animation model may include using the position information of the one or more representations. Producing the animation model may include using a mesh of vertices that represents one of the one or more expressions of the object. The produced animation model may be an updated version of another animation model. Each control in the groups of controls may be selected from a standard set of controls. Each control in each group of controls may be selected based upon the corresponding expression of the object. Producing the animation model may include producing one or more shapes capable of presenting each of the one or more expressions of the object. Producing the animation model may include determining if the animation model is capable of accurately presenting the one or more expressions of the object. Producing the animation model may include determining if the animation model is capable of accurately presenting the one or more expressions of the object. Producing the animation model may include adding the one or more corrective shapes to the animation model, in which each corrective shape is associated with two or more controls included in one of the groups of controls. The collected images of the object may include visual scans of the object.

The collected images of the object may include images of the object electronically created by an individual. The one or more expressions may include facial expressions. The object may be an actor's face, the face of a non-human creature, or other type of object.

In another aspect, a computer program product tangibly embodied in an information carrier and comprising instructions that when executed by a processor perform a method that includes receiving multiple representations of one or more expressions of an object. Each of the representations includes position information attained from one or more images of the object. The method also includes producing an animation model from one or more groups of controls that respectively define each of the one or more expressions of the object as provided by the multiple representations. Each control of each group of controls has an adjustable value that defines the geometry of at least one shape of a portion of the respective expression of the object. Producing the animation model includes producing one or more corrective shapes if the animation model is incapable of accurately presenting the one or more expressions of the object as provided by the multiple representations.

Implementations may include any or all of the following features. Producing the animation model may include using the position information of the one or more representations. Producing the animation model may include using a mesh of vertices that represents one of the one or more expressions of the object. The produced animation model may be an updated version of another animation model. Each control in the groups of controls may be selected from a standard set of controls. Each control in each group of controls may be selected based upon the corresponding expression of the object. Producing the animation model may include producing one or more shapes capable of presenting each of the one or more expressions of the object. Producing the animation model may include determining if the animation model is capable of accurately presenting the one or more expressions of the object. Producing the animation model may include determining if the animation model is capable of accurately presenting the one or more expressions of the object. Producing the animation model may include adding the one or more corrective shapes to the animation model, in which each corrective shape is associated with two or more controls included in one of the groups of controls. The collected images of the object may include visual scans of the object. The collected images of the object may include images of the object electronically created by an individual. The one or more expressions may include facial expressions. The object may be an actor's face, the face of a non-human creature, or other type of object.

Various implementations of the subject matter described here may provide one or more of the following potential advantages. In one implementation, rather than painstakingly building a detailed model of a character's face in a serial manner to represent various expressions, a "top-down" approach is implemented to efficiently construct a model. Initiated by collecting facial expressions (e.g., scanned from the actor's face, individually sculpted, etc.), the collected expressions are processed together to construct a model that is capable of representing each of the collected expressions (along with other expressions). By comparing expression provided by the constructed model to the initially collected expressions, the need for corrective action is quickly determined and taken to reduce differences and provide efficiently created realistic representations (e.g., to an end viewer).

Details of one or more implementations are set forth in the accompanying drawings and the description below. Other features, aspects and advantages will be apparent from the description and drawings, and from the claims.

DETAILED DESCRIPTION OF THE INVENTION

In offline applications such as motion pictures and online applications (e.g., virtual environments such as a video game), electronically created beings (e.g., an actor, character, etc.) may perform various roles (e.g., heroic roles, minor roles, etc.). For example, an entirely animated cast for a production may include a significant number of computer generated characters. Along with fanciful characters that are not based in reality (e.g., a unicorn, aliens, monsters, etc.) some of the characters may represent human beings. To provide an enjoyable experience to an end viewer and give the impression that the characters are real, a significant amount of detail may be incorporated into the computations for creating such animated characters. For example, a very detailed model of a character's face may be painstakingly produced that is capable of representing a large range of emotions (e.g., joy, sorrow, horror, etc.). Production of such models may call for a significant amount of time and resources (e.g., modeler time, etc.) For example, the model may be produced (and updated) by serially including facial expressions needed for presenting the character's performance. Happiness, sorrow, rage and facial expressions associated with other emotions may be incorporated in a serial manner by adding to and adjusting model content. As such, this piecemeal construction of the facial models may need to be considered in determining development schedules and budgets for productions. Further, to assure the rendered characters appear realistic and recognizable, some development time may be needed for checking and adjusting the model to assure that the facial expressions (used to construct the model) are appropriately represented. In some instances, adding expressions in such a serial manner may cause conflicts to appear among different portions of the character's face (as represented by the model). Corrective action may be required to address such conflicts so expected facial expressions are representable by the model. Such "bottom-up" approaches may produce models capable of presenting characters with considerable details, but the serial manner of model constructing may call for numerous adjustment iterations to assure that each facial expression (used to produce the model) is actually portrayed. However, rather than using a serial, piecemeal construction approach, a "top-down"

approach may be implemented that simultaneously uses facial expressions (of a character performance) to produce an animation model of a character's face. For example, rather than serially building up a complex facial model to accurately reflect a range of expressions, individual expressions may processed together to construct an animation model. Further, by processing the facial expressions together, corrective action may be taken during model production rather than making incremental (and possibly iterative) adjustments as the expressions are serially incorporated into a model. In effect, a model may be directly produced from the actual facial expressions of a character's performance rather than building up and adjusting a model to reflect these expressions.

Figure 1:
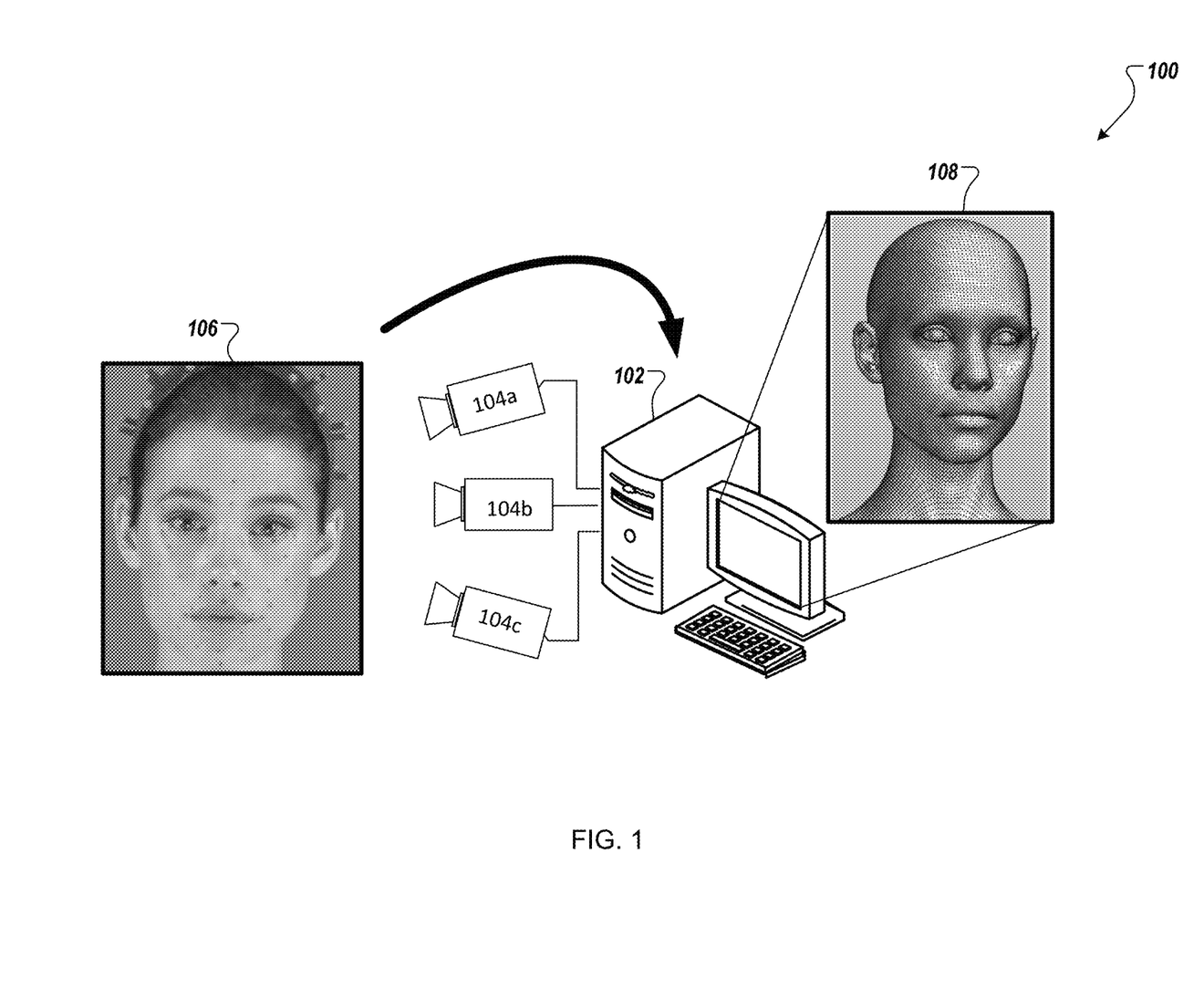
FIG. 1 illustrates a system for producing an animation model of an actor's face.

Referring to FIG. 1, a block diagram of an animation system 100 is presented that captures facial expressions of an actor (an actress in this example) and uses the captured information for efficiently producing an animation model that is capable of representing the captured expressions (along with other expressions). By processing the captured expressions together to construct an animation model, needed adjustments and corrections may be executed during processing of the expressions rather than in a piecewise or iterative manner. Further, such a process may provide for localized control of different portions of the character's face represented by the model while still accurately representing the facial expressions in the captured imagery (used to create the model).

One or more techniques or methodologies may be implemented to provide such a "top-down" approach for model production. For example, images of an actor may be collected that represent various facial expressions for inclusion in an animation model. Cameras, optical scanners (e.g., three-dimensional scanners that use optical range-finding techniques) or other types of image capturing devices may be used to collect imagery of facial expressions. From the captured imagery, position information associated with different facial features may be attained and processed. For example, an array of image capture devices (e.g., cameras) may be used to collect images from different angular aspects. By identifying facial features contained in the imagery, position information (e.g., of the features) may be determined. For example, data points (e.g., represented in a rectangular coordinate system) may be processed to define the relative position of the facial features. From this data, position information may be defined for facial features represented in each facial expression included in the captured imagery. To capture such imagery (e.g., with cameras, a scanner, etc.), artificial facial features (e.g., markers attached to locations on an actor's face, fluorescent paint applied to portions of a face, etc.), natural facial features (e.g., wrinkles located in the corner of an eye, the ridge of an actor's nose, etc.), combinations of artificial and natural facial features, etc. that may be included in the images (at different angular aspects) and may be used to assist in defining the position information. Once attained, the position information may be used for constructing the animation model of the actor's face, e.g., for presenting representations of the facial expressions included in the images along with other facial expressions.

Other techniques may also be implemented for producing representations of facial expressions to create an animation model. For example, highly-detailed representations (e.g., images, drawings, etc.) of a character's face may be created and used to provide expressions for producing an animation model. Creating such detailed representations may call for considerable amounts of time (e.g., for drawing detailed likenesses of a character's facial expressions) and resources (e.g., computational time, budget, etc.). As such, image capture may provide a more efficient technique for data collection. However, for some situations creating highly-detailed representations by drawing or other techniques (e.g., electronic sculpting) may be appropriate. For example, for fanciful non-human characters that do not resemble human actors (e.g., a monster, etc.), such techniques may provide the only reasonable methodology (since an actual creature does not exist for facial scanning) for producing facial expressions for use in model construction.

In the animation system 100 illustrated in the figure, a computer system 102 is in communication with an array of cameras (e.g., represented with three cameras 104a, 104b, 104c) that can be used to capture images (e.g., from three distinct perspectives) of an actor's face and provide data that represents the imagery to the computer system. In this arrangement, artificial markers have been applied to the actor (e.g., adhered in a pattern across the actor's face) to highlight facial features, however, other methodologies may be implemented (e.g., applying one or more paints to the actor's face, etc.), or, highlighting techniques may not be used in some situations (e.g., facial features may be distinct enough that artificial highlighting is not needed). Such markers can also provide information for other processes such as motion capture, for example. In this particular example, as represented in image 106 (that represents one perspective view captured by the camera array), darker colored (e.g., black) markers are used to highlight features of the actor's face and lighter colored (e.g., white) markers are incorporated into a skull cap and used to highlight movements of the upper portion of the actor's head.

From the images collected by the camera array or other collection device (e.g., an optical scanner), or through other techniques (e.g., electronically drawn or sculpted, etc.) position information is computed for the expressions and is processed to efficiently produce an animation model (e.g. an adjustable three dimensional numerical mesh) that mathematically defines the shape of the underlying asset. Once produced, the model can be used for various applications. For example, by collecting optical scans of an actor's face while he or she presents different expressions (to produce the animation model), the model can be used to produce substantially similar is not nearly identical representations of the collected facial expressions. Additionally, the animation model may be used for other functions such as tracking a facial performance of the actor. As shown in the figure, a three-dimensional representation 108 is presented that is produced from the created animation model. The representation 108 demonstrates the ability to produce a likeness that substantially matches the same facial expression of the actor that is used to create the model (e.g., a generally neutral facial expression). By processing the collected facial expressions together (e.g., scanned expressions, electronically sculpted expressions, etc.), an animation model may be efficiently produced in a "top-down" manner that is capable of providing representations that substantially match these collected expressions.

Figure 2:
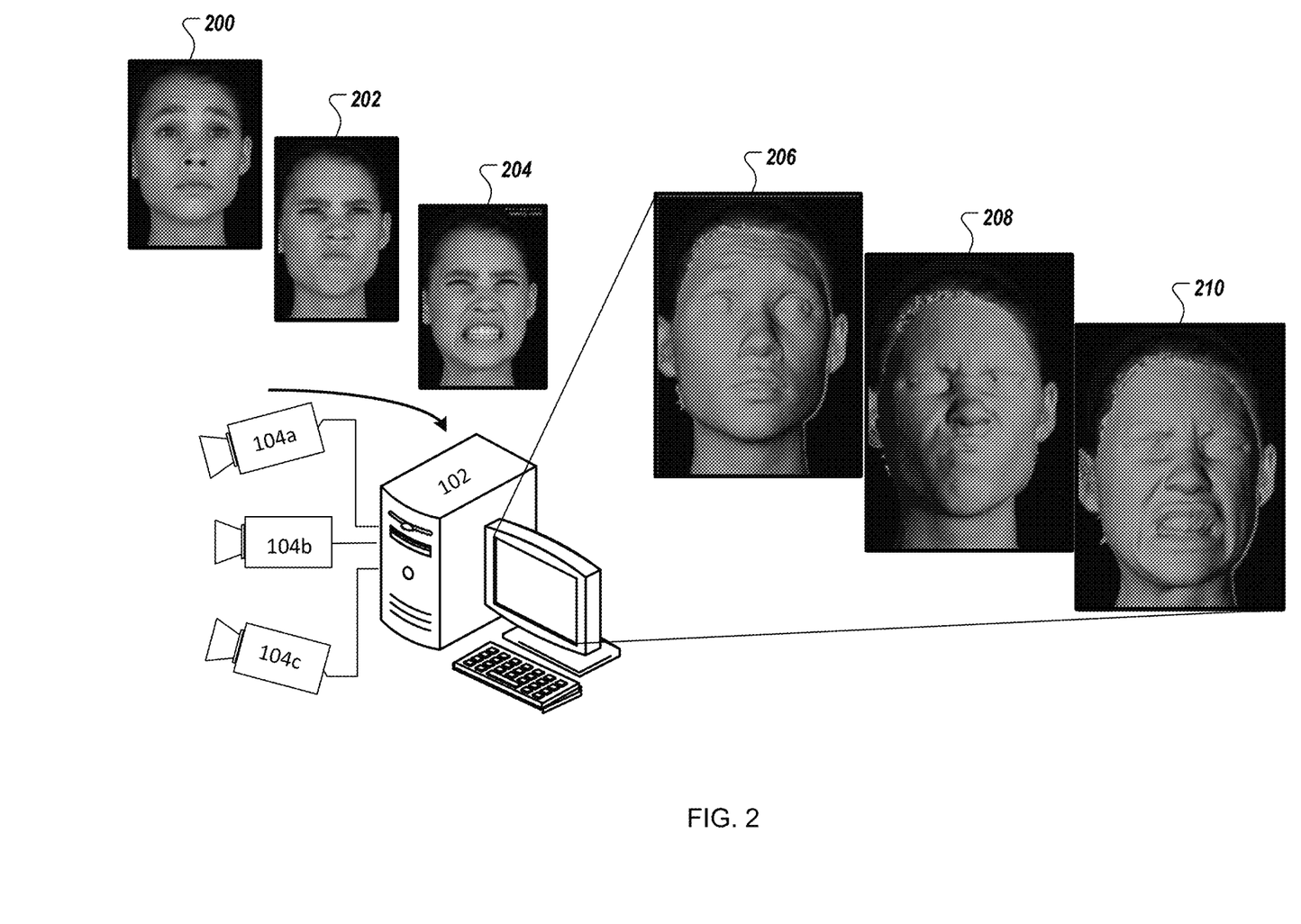
FIG. 2 illustrates the production of digital representations from captured images.

Referring to FIG. 2, multiple facial expressions of an actor are captured for producing an animation model that is capable of presenting representations that are substantially similar the captured expressions. In this arrangement the actor's face is optically scanned to attain three-dimensional position information (e.g., three-dimensional coordinates) of vertices that represent the surface of the actor's face. As shown in the figure, the camera array (e.g., represented by the three cameras 104a, 104b, 104c) is used to collect imagery of the actor's face from different perspectives. For example, images 200, 202 and 204 illustrate three different facial expressions captured from one perspective. In this example, as provided by the images 200-204, a somewhat neutral expression is provided by one image though the actress's eyebrows are raised (i.e., image 200) while more extreme expressions are provided by the other images (i.e., images 202 and 204). While this example demonstrates three facial expressions being captured, more or less expressions of similar or different types of expressions may be collected and used for producing an animation model. For example, facial expressions closely associated with an actor or a portrayed character, e.g., a so-called signature expression (e.g., a wink, a sly grin, smirk, etc.) may also be included for producing the model. Along with being associated with a character or a performance, such signature expressions may assist end viewers with quickly recognizing the character or actor. For some productions such expressions may be considered integral to a performance and important to accurately reproduce.

In this arrangement, the captured imagery (e.g., scans) is provided to the computer system 102 to produce three dimensional representations (e.g., three dimensional position information) of the captured facial expressions for processing. In this example, the scanned imagery is used to produce a three-dimensional representation 206 that corresponds to the raised eyebrow expression shown in image 200 and two three-dimensional representations 208 and 210 that respectively correspond to images 202 and 204. In some arrangements, additional processing operations may be executed upon the collected imagery, the three-dimensional representations or other related data sets. For example, data attributes associated with the collected images or three-dimensional representations may be adjusted or processed.

Figure 3:
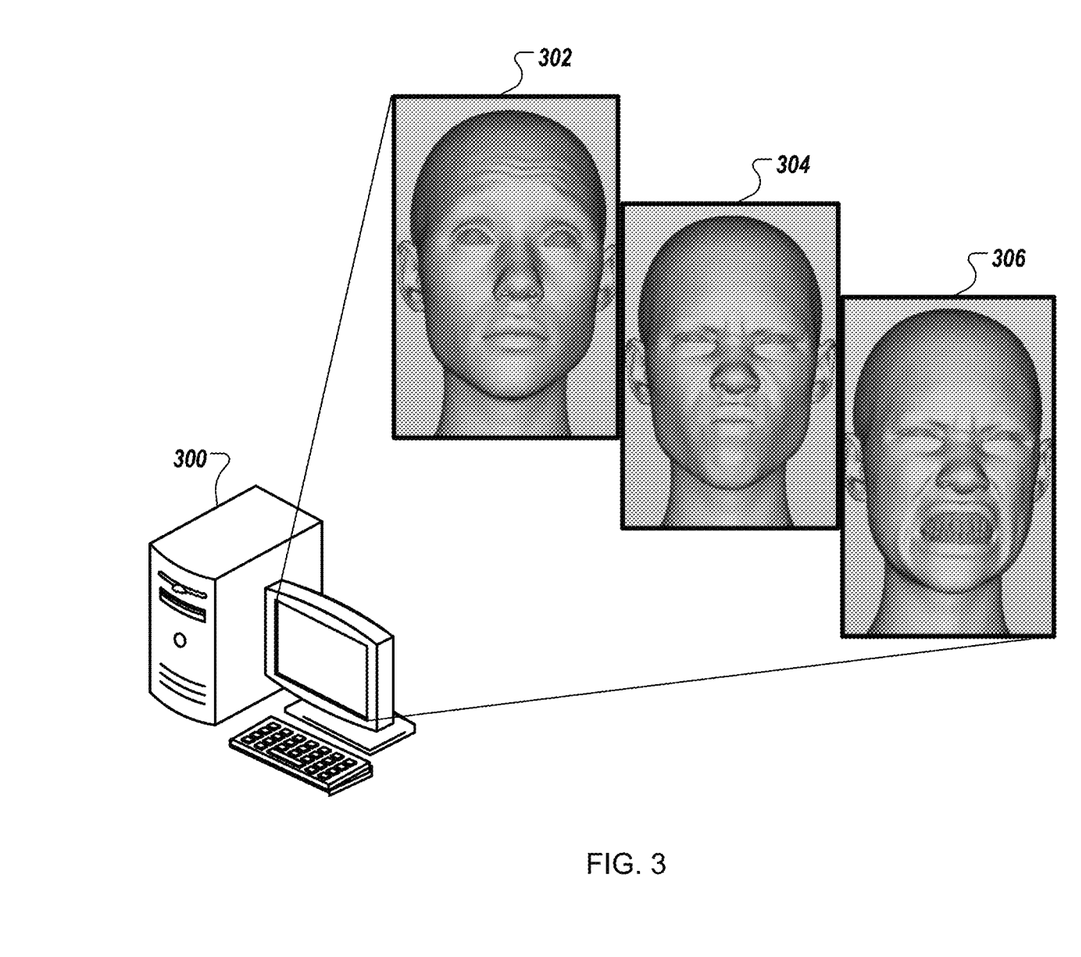
FIG. 3 illustrates facial expressions provided from an animation model.

Referring to FIG. 3, the scanned representations of facial expressions collected in FIG. 2 (e.g., three-dimensional representations 206-210) are used for model production. In this arrangement a computer system 300, which may also be the computer system 102 (shown in FIG. 2), is used to process the scanned representations. In general, the collected facial expressions are used together for model production. As such, the facial expression data can be considered as being simultaneously processed to produce a model, and not being built up in a serial manner, thereby reducing the probability of interfering expressions caused by incorporating newer expressions into a serially-constructed model. Various techniques may be implemented to process the expressions together, for example, data that represents a baseline facial expression can be processed with data associated with each of collected expressions. In one arrangement, a neutral facial expression may be used during processing as a baseline. Such a neutral expression may be attained by scanning an actor's face (e.g., for a human character) similar to other scanned expressions, creating (e.g., drawing) the expression (e.g., for a non-human character), electronically sculpting, etc. or by one or more other techniques. By attaining data (e.g., vertices represented in three dimensional coordinates) that represents a neutral expression, other expressions (e.g., of more extreme emotions, signature expressions, etc.) can be represented by calculating the difference between these expressions and the neutral expression (e.g., position difference of corresponding vertices). As such, by providing a representation of a neutral expression and the differential data, information for each of the expressions may be processed.

Additional information may also be used for producing an animation model that is capable of accurately representing the collected facial expressions. For example, the geometry of portions of the animation model may be manipulated by a set of controls. As such, by adjusting the controls, different facial expressions may be represented by the model. In some arrangements the set of controls may be considered as a standard for adjusting particular portions of a face (e.g., the upper portion of the left eyebrow, the lower right corner of the mouth, etc.). Corresponding control values that together define the collected expressions may also be provided for model construction and other functions. Additionally, while some controls may be needed to define one expression, more or less controls may be needed to define other expressions. As such, the controls needed to produce an expression may be identified and provided along with actual values of the controls for model production. One or more techniques may be used to determining which controls and corresponding control values are needed. For example, by reviewing the collected expressions (e.g., scanned imagery of the expressions), a modeler can determine which controls are needed to represent the expression and the corresponding control values. Often an experienced modeler may be able to select particular controls and dial in the appropriate control values by simply viewing the collected facial expressions (e.g., viewing three-dimensional representations 206, 208, 210). For some less experienced modelers, a visual aid may be needed to control selection and value determination. For example, a modeler may use controls associated with a previously created model to dial in values to substantially match the collected expressions (to identify controls and corresponding values needed to define each expression). Once controls and corresponding values have be determined, this data along with the neutral expression and the position information of the other expressions (relative to the neutral expression) can be used together to produce a model in a "top-down" manner. Once produced, the model can be used to present expressions, such as accurate representations of the collected expressions, as illustrated in the figure as representations 302, 304 and 306 (that respectively correspond to the three-dimensional representations 200, 202 and 204 shown in FIG. 2). Further, once produced, the animation model may be used in various applications. For example, along with being used to create and re-create facial expressions, additional imagery of the actor's face may be collected (e.g., video of the actor performing a character role) for retargeting such that facial expressions of a computer generated character seemingly track the performance of the actor. The animation model may also be updated with additionally collected expressions (e.g., more scanned or electronically sculpted facial expressions). To update the model, less information may be needed, compared to the amount of information used to originally create the model. For example, since a neutral expression has been previously provided as a baseline expression, data for updating the model may only call for identified controls and control values for representing the additional expressions. Position information associated with the additional expressions (e.g., position of vertices of a facial expression relative to a neutral expression) may also be used for updating a previously created model.

Figure 4:
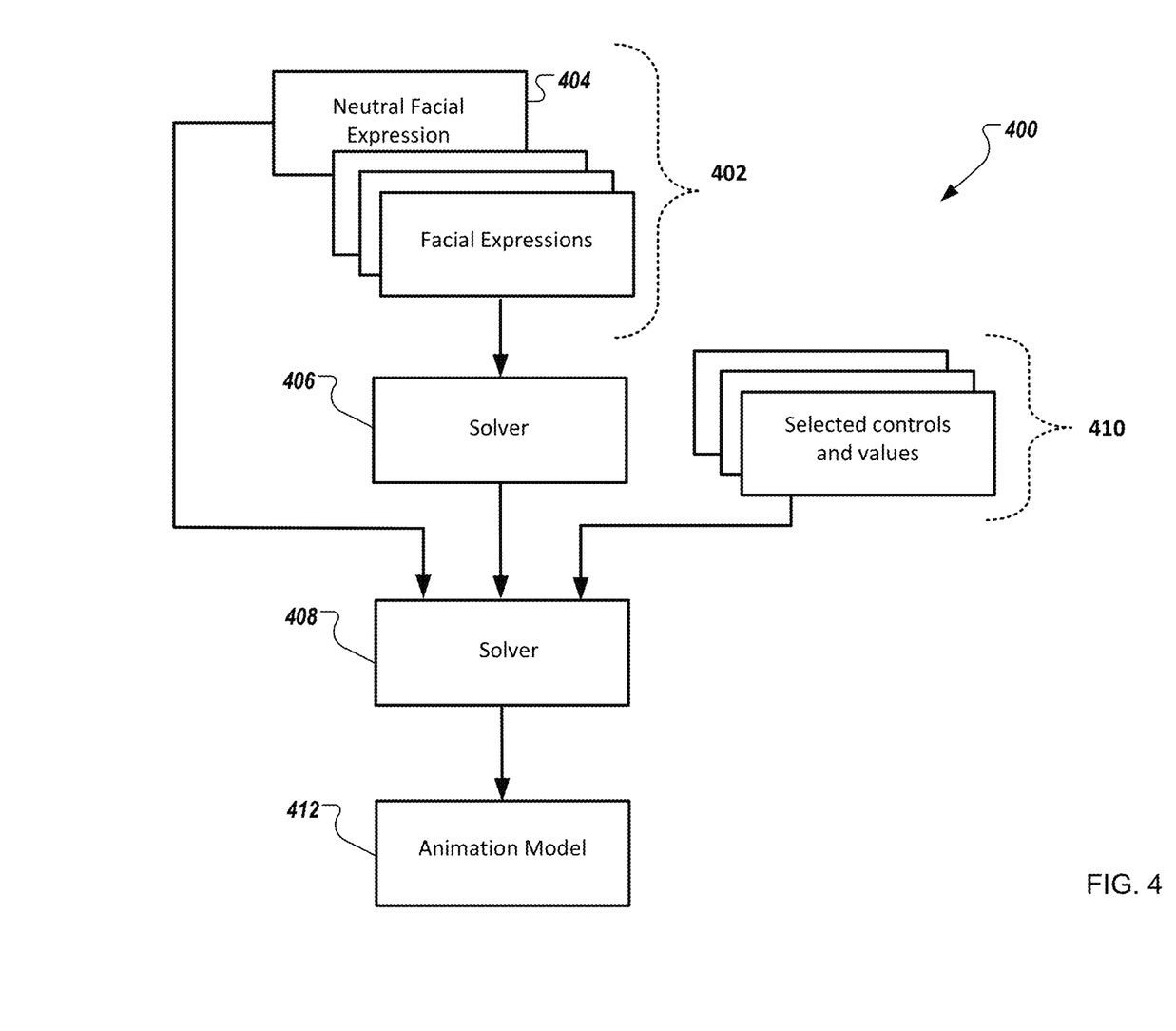
FIG. 4 is a block diagram of processes for constructing an animation model.

Referring to FIG. 4, a diagram 400 represents processes that can be executed to produce an animation model in a "top down" manner from collected facial expressions 402 (e.g., scanned images, electronically drawn or sculpted expressions, etc.). In general, the facial expressions may be represented in a common form (e.g., three-dimensional representations) and provide position information (e.g., three dimensional coordinates of vertices). Along with representations of various emotions, the facial expressions 402 include a neutral facial expression 404 (or an expression of some other emotion or lack of emotion) that provides a baseline for the position information (e.g., the position of vertices included in the neutral expression serve to as a reference for corresponding positions in other expressions). One or more techniques may be implemented to determine the spatial differences between features represented in each of the facial expressions and the neutral facial expression. In one arrangement, a solver 406 is provided the collection of expression 402 (e.g., position information of the neutral expression and the other expressions) and may implement one or more methodologies. For example, the solver 406 may produce a smooth deformation that substantially aligns two geometries. By using a sparse set of three dimensional correspondences (e.g., user-specified) between surface points of the geometries, a dense deformation field may be produced from the sparse correspondences using one or more techniques such as Laplace-based spatial regularization, iterative closest point computations, etc. In the illustrated arrangement, provided the data, the solver 406 calculates the spatial differences between features of the neutral expression (e.g., as provided by position information of vertices) and corresponding portions of the other expressions. Once quantified, position information associated with each expression (relative to the neutral expression) is provided to another solver 408, in this arrangement, for producing a model e.g., a deformable mesh such as a three-dimensional facial rig (e.g., a collection of shapes with controllable geometries) that is capable of accurately representing each of the facial expressions 402 of the performing character (e.g., human, non-human creature, other type of being, etc.).

Along with providing the solver 408 with position information associated with each expression included in the collection 402, other information may also be provided for model production. For example, the geometry of a graphical representation of the character may be provided by one or more of the collected expressions. Since the neutral facial expression 404 serves as a baseline geometry (as provided to the solver 406), data that represents the neutral facial (e.g., a mesh of vertices that define the features of the neutral expression) is provided to the solver 408. For each facial expression in the collection 402, selected controls (e.g., from a standard set of controls) along with corresponding values 410 for each control may be provided to the solver 408. By providing this information, the solver 408 is aware of the controls and the values needed to represent each collected expression (e.g., joy, fear, horror, etc.). While the standard set may include a relatively large number of controls (e.g., one-hundred twenty, one-hundred fifty, etc.), not all the controls may be needed to represent each facial expression. In some instances only a relatively small subset of the controls (e.g., thirty of the one-hundred fifty control parameters) may be needed to represent a facial expression. For example, facial expressions that involve extreme position changes to the mouth (e.g., screaming) may call for the use of more controls associated with the mouth compared to other expressions that do not significantly involve movements of the mouth (e.g., winking with the left eye while being generally content). As such, a similar group of controls may be selected or a quite different group of controls may be selected from the standard control as being needed to represent each expression (e.g., a set of twenty control parameters with values are identified as being associated with one facial expression while a set of fifteen control parameters with values are identified as being associated with another pose). In some instances the same controls may be identified as being needed for different expressions (e.g., the controls overlap), or, in other instances, separate and distinct controls (e.g., non-overlapping parameters) may be identified as being needed to represent different expressions.

Upon being provided the information associated with the collected facial expressions, the solver 408 may produce an animation model 412. One or more techniques may be implemented by the solver 408 (e.g., an example-based retargeting solver) to produce the animation model 412. For example, a two-step process may be implemented for model production. For one step in the process, shapes (referred to as base shapes) may be defined that represent the facial deformations of each facial expression provided to the solver 408. Generally, for each selected control (for an expression) provided to the solver 410, a base shape is produced whose geometry may be deformed based upon the range of values associated with the control. For example, being set to one value within the range, a control may direct the base shape to deform in one manner (e.g., slightly raises the base shape that represents a character's left eyebrow) while another value directs a different deformation (e.g., significantly raise the left eyebrow base shape). One or more techniques and methodologies may be implemented for producing such base shapes for each corresponding control. For example, the solver 408 may use one or more least squares techniques (e.g., a sparse least squares solver) to calculate the base shapes.

The second step in the two-step process generally determines if the base shapes produced in the first step accurately represent the facial expressions 402, and taking corrective action if needed. For example, if the base shapes produced by the solver 408 do not accurately represent the scanned facial expressions, additional shapes (referred to as corrective shapes) may be defined such that the animation model 412 is adjusted to properly represent the scanned facial expressions. To provide such functionality, the solver 408 may be capable of comparing information for each facial expression provided by the solver 406 to corresponding facial expressions as provided by the base spaces produced by the solver 408. If the expressions substantially match, corrective action may not be needed and the animation model 412 may be considered as being capable of producing representations that correlate to the collected expressions 402. If a match is not detected, one or more corrective shapes can be produced and applied to the animation model 412. One or more techniques or methodologies may be implemented by the solver 408 to produce such corrective shapes. For example, using spatial wavelet basis functions, the solver 408 may implement a pseudo-inverse solver technique to produce wavelet basis functions that provide corrective shapes. In general, corrective shapes are often needed to address two or more potentially conflicting base shapes (produced by the solver 408). For example, while simultaneously adjusting controls associated with two base shapes (e.g., dialing-up the controls to increase corresponding values), the adjustments may cause the geometries of the two base shapes to interfere. Due to the conflict (or multiple conflicts) incorrect facial expressions may be produced by the animation model 412. As such, corrective shapes can be associated with two or more controls (e.g., that are associated with different base shapes). While interfering base shapes may provide a basis for introducing one or more corrective shapes, such corrective shapes may also be introduced due to other sources that cause presented facial expressions not to match the collected expressions 402.

Figure 5:
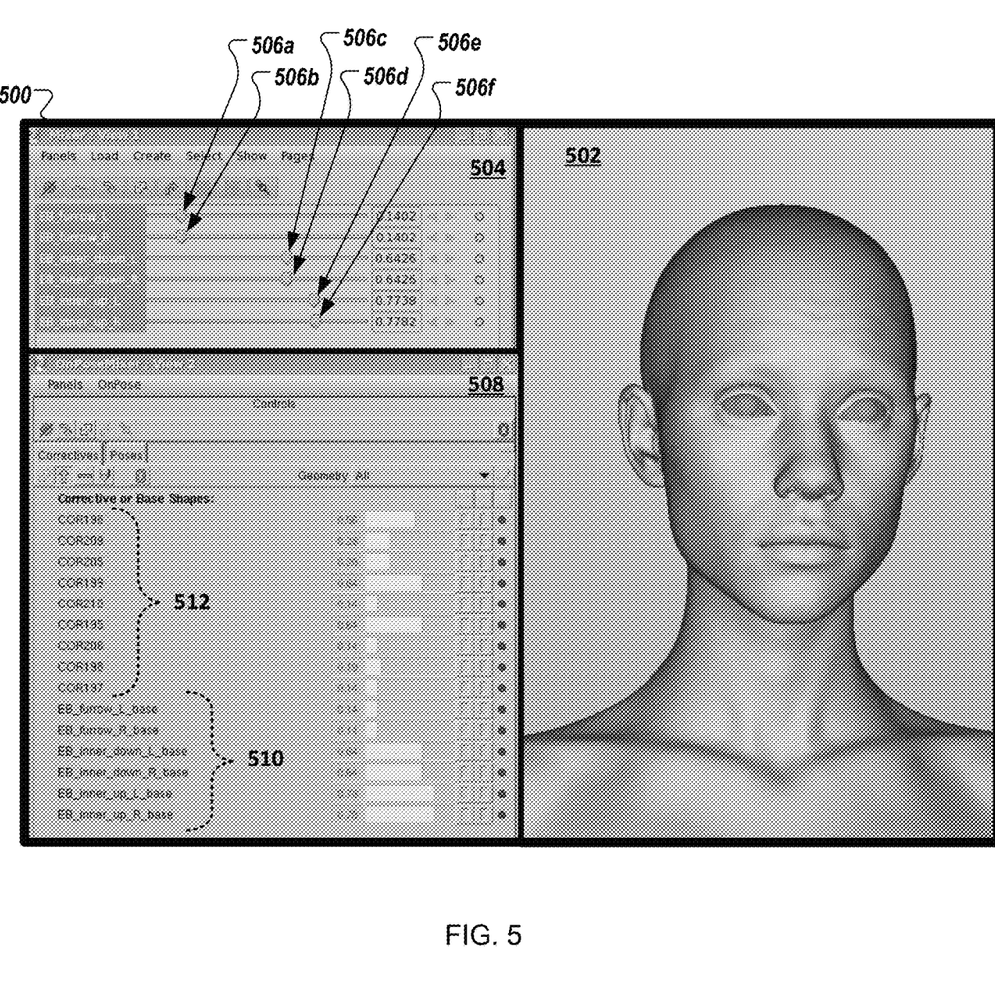
FIG. 5 is a user interface for reviewing and using representations of an animation model.

Referring to FIG. 5, a user interface (UI) 500 is presented that illustrates the interrelationship among base shapes and corrective shapes as produced by a solver (e.g., the solver 408 shown in FIG. 4) for an animation model (e.g., the animation model 412 also shown in FIG. 4). In this particular example, the UI 500 includes a portion 502 that presents a representation of a character's face (an actor's face) as provided by an animation model. The UI 500 also includes a portion 504 that presents a series of graphical sliders 506a-f for a user to adjust the values of controls associated with the animation model. By dialing values into one or more of the graphical sliders 506a-f the presented facial expression is adjusted (e.g., in near real time). In this illustration, each of the graphical sliders 506a-f is respectively associated with portions of the character's left and right eyebrow. For example, either or both of the eyebrows may be raised (e.g., to present an expression of shock, surprise, etc.), lowered (e.g., to present an expression of seriousness, anger, etc.) or placed in other positions for desired facial expressions.

To provide the ability of changing the positions of the facial features (e.g., the character's left and right eyebrows), each of the graphical sliders 506a-f are linked to one or more base shapes included in the animation model. Additionally, as determined at the production of the animated model, pairs of base shapes (or combinations that include more base shapes), as provided by the graphical sliders 506a-f, are also linked to one or more corresponding corrective shapes (e.g., for addressing conflicts between base shape pair or more combinations of base shapes). In this illustrative example, a portion 508 of the UI presents a listing of base shapes and corrective shapes linked to respective graphical sliders 506a-f that may be adjusted by a user. In particular, a list of base shapes 510 identifies each base shape along with a graphical indicator (e.g., a graphical bar) that provides a value that corresponds to amount the geometry of the respective base shape has been deformed. A list of the corrective shapes 512 is similarly presented along with graphical indicators that also provide deformation values. As noticeable by visual inspection, the number of graphical sliders (in portion GUI portion 504) needed for user interaction is far less than the total number of base shapes and corrective shapes being adjusted. As such, an animator can focus on adjusting the controls (e.g., a standardized set of controls) without the need of interacting with the larger group of individual base shapes and corrective shapes included in the animation model to present facial expression nearly identical to the collected facial expressions (e.g., scanned from the actor's face, electronically sculpted, etc.) used to produce the animation model.

Figure 6:
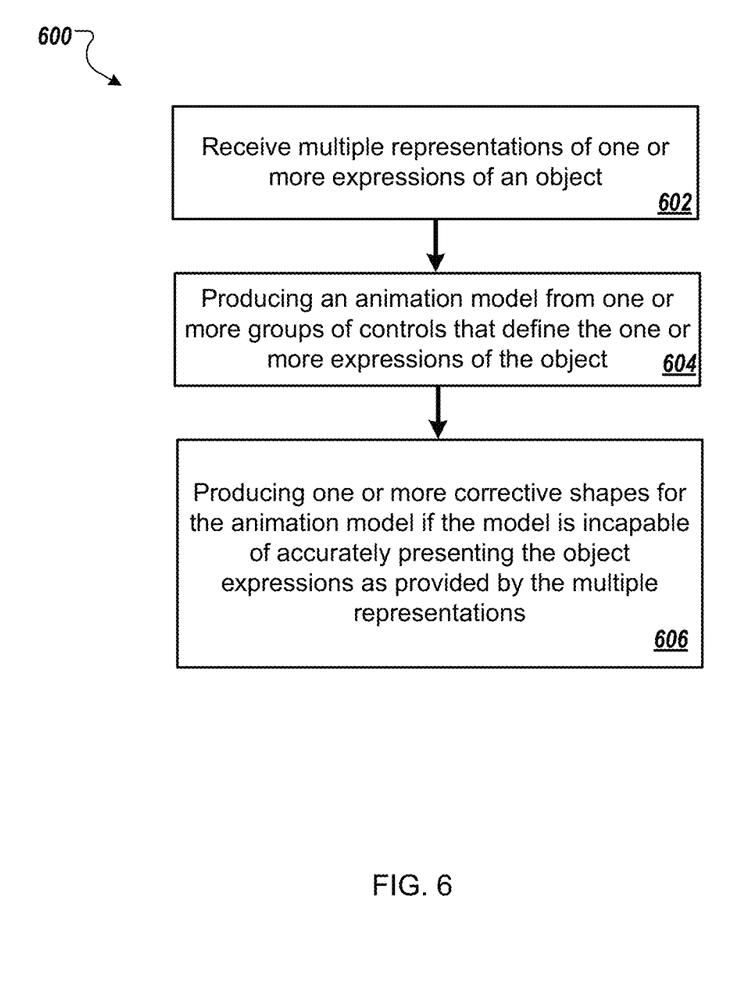
FIG. 6 is a flow chart of operations for producing an animation model.

Referring to FIG. 6, a flowchart 600 represents operations of a computing device such as the computer system 102 (shown in FIGS. 1 and 2) to produce an animation model from facial expressions (e.g., captured from an actor's face, electronically sculpted, etc.). Such operations are typically executed by components (e.g., one or more processors) included in a computing device, however, operations may be executed by multiple computing devices. Along with being executed at a single site, operations execution may be distributed among two or more locations.

Operations of the computing device may include receiving 602 multiple representations of one or more expressions of an object. For example, an actor's face may be scanned by an image capture device to capture a series of facial expressions. Once captured, position information may be attained from the captured imagery for processing by the computing device. Operations may also include producing 604 an animation model from one or more groups of controls that define the one or more expressions of the object as provided from the multiple representations. For example, such a model may be produced from values of adjusted controls that represent geometrical deformation of shapes to present facial expressions. Operations may also include producing 606 one or more corrective shapes for the animation model if the model is incapable of accurately presenting the expressions of the object as provided by the multiple representations. For example, a corrective shape may be produced to address two or more conflicting controls that are each attempting to adjust the geometry of different base shapes. Once produced, the animation model can be used for various applications such as presenting facial expressions on an animated character, tracking additional facial expression of the actor (e.g., captured in additional imagery), etc. for use in online productions (e.g., a video game title) or offline productions (e.g., a motion picture).

Figure 7:
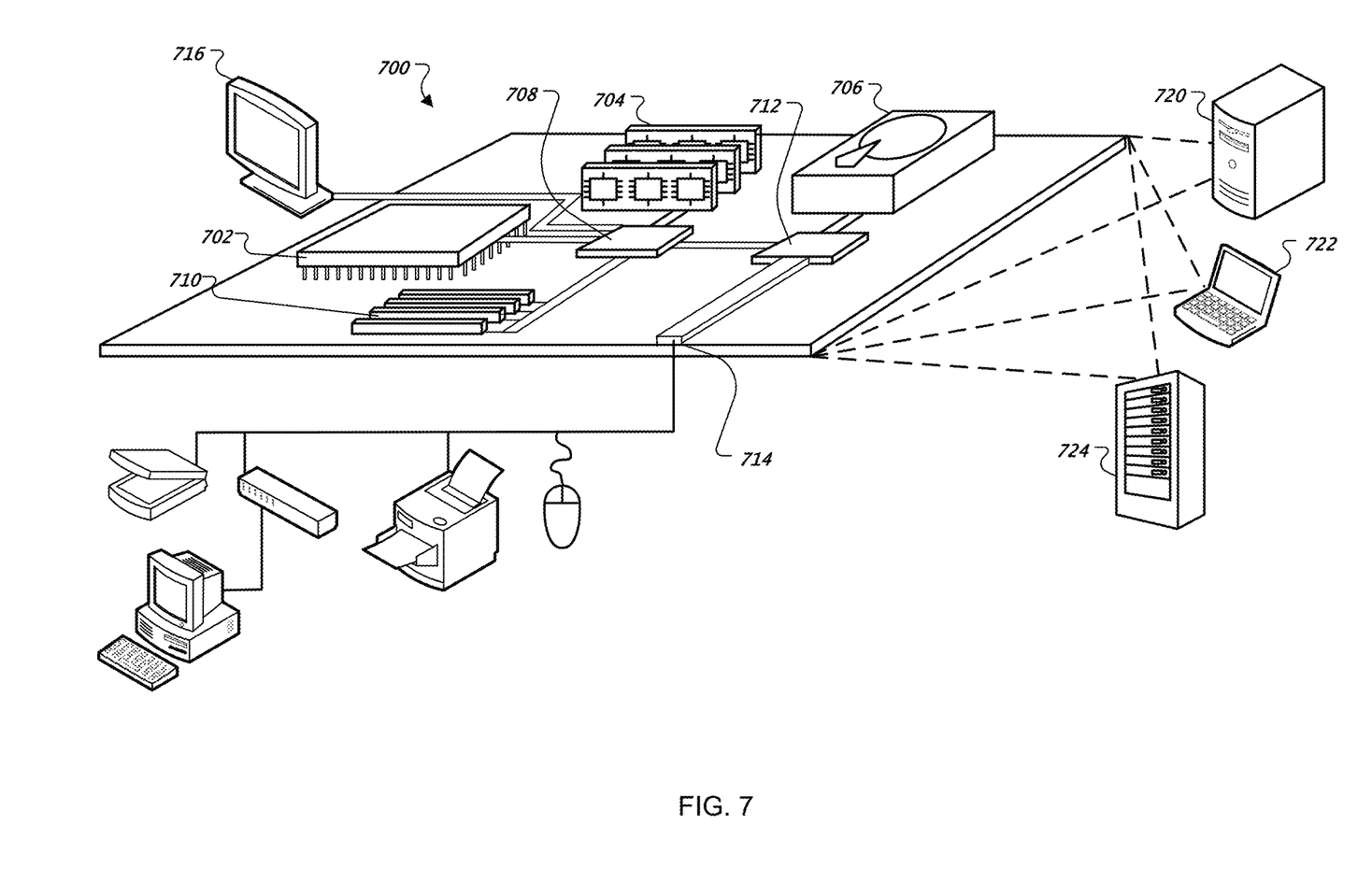
FIG. 7 shows an example of a computing device that can be used in connection with computer-implemented methods and systems described in this document.

FIG. 7 shows an example of a computing device 700 and that can be used to implement the techniques described for producing an animation model. The computing device 700 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 704, the storage device 706, or memory on the processor 702.

The high-speed interface 708 manages bandwidth-intensive operations for the computing device 700, while the low-speed interface 712 manages lower bandwidth-intensive operations. Such allocation of functions is exemplary only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown). Each of such devices may contain one or more of the computing device 700 and the mobile computing device, and an entire system may be made up of multiple computing devices communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A method comprising:
receiving, by a computer system, a plurality of three-dimensional (3-D) representations of facial expressions;

receiving, by the computer system, a 3-D representation of a neutral facial expression;

calculating, by the computer system, spatial differences between features of the 3-D representation of the neutral facial expression and corresponding features of the plurality of 3-D representations of the facial expressions by providing the plurality of 3-D representations of the facial expressions and the 3-D representation of the neutral facial expression to a first solver that uses a sparse set of 3-D correspondences between surface points of the plurality of 3-D representations of the facial expressions and the 3-D representation of the neutral facial expression to generate a dense deformation field;

generating, by the computer system, a model that is capable of representing each of the facial expressions; wherein the model is generated using the spatial differences.

2. The method of claim 1, wherein the model comprises a deformable mesh.

3. The method of claim 1, wherein the model comprises a 3-D facial rig comprising a collection of shapes with controllable geometries.

4. The method of claim 1, wherein the first solver produces a smooth deformation that substantially aligns two geometries.

5. The method of claim 1, wherein the sparse set of 3-D correspondences is user-provided.

6. The method of claim 1, wherein the dense deformation field is generated using a Laplace-based spatial regularization.

7. The method of claim 1, wherein the dense deformation field is generated using iterative closest-point computations.

8. A system comprising:
one or more processors; and
one or more memory devices comprising instructions that, when executed by the one or more processors, cause the one or more processors to perform operations comprising:
receiving a plurality of three-dimensional (3-D) representations of facial expressions;
receiving a 3-D representation of a neutral facial expression;
calculating spatial differences between features of the 3-D representation of the neutral facial expression and corresponding features of the plurality of 3-D representations of the facial expressions by providing the plurality of 3-D representations of the facial expressions and the 3-D representation of the neutral facial expression to a first solver that uses a sparse set of 3-D correspondences between surface points of the plurality of 3-D representations of the facial expressions and the 3-D representation of the neutral facial expression to generate a dense deformation field;
generating a model that is capable of representing each of the facial expressions; wherein the model is generated using the spatial differences.

9. The system of claim 8, wherein generating the model that is capable of representing each of the facial expressions comprises:
providing the spatial differences to a second solver.

10. The system of claim 9, wherein the 3-D representation of the neutral facial expression serves as a baseline geometry for the second solver.

11. The system of claim 9, wherein the operations further comprise providing a standard set of controls to the second solver.

12. The system of claim 11, wherein the operations further comprise providing a subset of controls from the standard set of controls for each of the facial expressions to the second solver.

13. The system of claim 12, wherein the operations further comprise providing values for each control in the subset of controls to the second solver.

14. The system of claim 12, wherein the standard set of controls comprises more than 120 controls.

15. The system of claim 12, wherein the subset of controls comprises less than 30 controls.

16. The system of claim 11, wherein the second solver defines base shapes that represent facial deformations of each of the facial expressions that can be controlled by the corresponding subset of controls.

17. The system of claim 16, wherein the second solver determines that the base shapes do not accurately represent the facial expressions, and generating one or more corrective shapes associated with two or more of the standard set of controls.

18. A non-transitory, computer-readable medium comprising instructions that, when executed by one or more processors, cause the one or more processors to perform operations comprising:
receiving a plurality of three-dimensional (3-D) representations of facial expressions;
receiving a 3-D representation of a neutral facial expression;
calculating spatial differences between features of the 3-D representation of the neutral facial expression and corresponding features of the plurality of 3-D representations of the facial expressions by providing the plurality of 3-D representations of the facial expressions and the 3-D representation of the neutral facial expression to a first solver that uses a sparse set of 3-D correspondences between surface points of the plurality of 3-D representations of the facial expressions and the 3-D representation of the neutral facial expression to generate a dense deformation field;
generating a model that is capable of representing each of the facial expressions; wherein the model is generated using the spatial differences.

19. The non-transitory, computer-readable medium of claim 18, wherein the operations further comprise:
providing the spatial differences to a second solver, wherein the 3-D representation of the neutral facial expression serves as a baseline geometry for the second solver;
providing a standard set of controls to the second solver;
providing a subset of controls from the standard set of controls for each of the facial expressions to the second solver; and
providing values for each control in the subset of controls to the second solver.

20. The non-transitory, computer-readable medium of claim 19, wherein:
the second solver defines base shapes that represent facial deformations of each of the facial expressions that can be controlled by the corresponding subset of controls; and
the second solver determines that the base shapes do not accurately represent the facial expressions, and generating one or more corrective shapes associated with two or more of the standard set of controls.

* * * * *